United States Patent [19]
Balle

[11] 3,734,656
[45] May 22, 1973

[54] TIRE VULCANIZING PRESS
[75] Inventor: Walter Balle, D-6451 Dornigheim ub. Hanau/Main, Germany
[73] Assignee: Leonhard Herbert Maschinenfabrik, Bergen-Enkheim, Germany
[22] Filed: Dec. 1, 1971
[21] Appl. No.: 203,655

[30] Foreign Application Priority Data
Dec. 5, 1970  Germany .................... P 20 60 018.4

[52] U.S. Cl. .................................. 425/34, 425/233
[51] Int. Cl. ........................................... B29h 5/02
[58] Field of Search ................. 425/28, 33, 34, 36, 425/47, 233

[56] References Cited
UNITED STATES PATENTS
| 2,147,081 | 2/1939 | Beckman | 425/47 |
| 3,336,635 | 8/1967 | Soderquist | 425/33 |
| 3,467,989 | 9/1969 | Youngblood et al. | 425/36 |
| 3,609,819 | 10/1971 | Searle | 425/36 X |

FOREIGN PATENTS OR APPLICATIONS
| 1,014,312 | 8/1957 | Germany |
| 1,265,393 | 4/1968 | Germany |

Primary Examiner—J. Howard Flint, Jr.
Attorney—Woodhams, Blanchard & Flynn

[57] ABSTRACT

In a tire vulcanizing press of the kind in which two side by side moulds are opened and closed simultaneously adjustment of the closing pressure is effected by the inclusion of shim plates in openings provided in connecting rods by which a top part of the press is reciprocated relative to a bottom part. The shim plates determine the positions in the openings of bearings by which the connecting rod is connected to the top press part. Adaptor plates can also be inserted between the moulds and one of the press parts for the purpose of adapting the press to accommodate moulds of different heights.

10 Claims, 6 Drawing Figures

TIRE VULCANIZING PRESS

BACKGROUND OF THE INVENTION

1. Field of the Invention

This invention relates to a tire vulcanizing press of the kind comprising a bottom press part to receive in side by side relation the lower parts of each of two tire vulcanizing moulds, a top press part reciprocable towards and away from the bottom press part and arranged to receive the top parts of the tire vulcanizing moulds, connecting rods located one each on opposite sides of the press and pivotally connected to the top press part, driving means mounted on the bottom press part and operable to effect reciprocation of the top press part, and a mould height adjusting device for adapting the press to various mould heights.

2. Description of the Prior Art

Vulcanizing moulds of different heights are usually fitted in tire vulcanizing presses. In presses of this kind the distance travelled by the top press part remains the same for all mould heights. For the purpose of adaptation to moulds of different heights there are therefore provided mould height adjusting devices which enable the distance between the fastening surface for the top part of the mould to be moved nearer the fastening surface for the bottom part of the mould. The closing pressure of the press is adjusted at the same time with this adjusting device.

A mould height adjusting device is known in which there is provided on the top press part a pin which is provided with a screwthread on which a threaded sleeve can be screwed. The outer thread of the threaded sleeve engages in a threaded bore in a fastening plate for the top part of the tire vulcanizing mould. By turning the threaded sleeve the distance between the fastening plate and the bottom press part can be varied. The fastening plate is made very rigid, because the entire moulding pressure is of course applied through the screwthread and must be distributed by the fastening plate over the tire vulcanizing mould.

A tire vulcanizing press for retreading tires, which has only one vulcanizing mould, is also known from German Patent specification No. 1,014,312. In this known press the bearing bores for the engagement of the pins of the top press part are situated in bearings which are mounted slidably in the connecting rods, while the position of the bearings relative to the connecting rods is variable by means of shims. This arrangement serves to compensate for the height of intermediate rings which can be inserted between the mould halves in order to take into account various profile widths of the tires which are to be retreaded.

SUMMARY

It is a main object of the present invention to construct a tire vulcanizing press of the kind first described above, that is to say a double press, in such a manner that the press can be adjusted to various mould heights and the exact adjustment of the correct closing pressure of the press is possible without using threaded parts which are rotatable relative to one another.

According to the invention this object is achieved by providing the connecting rods with bearings which are slidable lengthwise of the connecting rods and which are adjustable by means of shim plates, while for the purpose of adapting the press to accommodate moulds of different heights at least one adaptor plate is insertable between the mould and one of the press parts.

In a press constructed in this manner adaptor plates are inserted only in order to compensate for differences in mould heights. In one embodiment of the invention each adaptor plate, as viewed in plan, has dimensions not less than those of the mould. Exact adaptation, that is to say adjustment of the correct closing pressure, is effected by adjusting within relatively narrow limits, with the aid of shim plates, the bearings which are provided on the connecting rods and in which the pins on the top press part engage. The press according to the invention is extremely simple in construction, since the expensive threaded parts provided in known mould height adjusting devices are eliminated. With the arrangement according to the invention it is also possible for the overall height of the press to be considerably reduced, since threaded parts increasing this height are dispensed with. The press according to the invention is extremely robust, since troubles which could be caused by the seizing of adjusting threads are avoided. These troubles occur relatively frequently because the threaded parts are exposed to relatively high temperatures which destroy lubricants applied to the screwthreads.

On at least one side of each mould, the insulating plate or the heating plate may have in the region thereof nearest a connecting rod a lesser thickness than that of the portion of the plate which is diametrally opposite in relation to the axis of the mould. This compensates for elastic deflection of the top press part. Compensation for deflection enables the top press part to be made relatively light or for this part not to have to be made thicker than in presses which are provided with rotatable threaded parts and pressure plates fastened thereon and in which the deflection of the top press part is compensated by a certain movability of the threaded parts and pressure plate. Compensation for deflection also makes it possible to dispense with flexurally stiff pressure plates of the kind used in presses in which the moulding pressure applied by centrally disposed threaded parts has to be distributed over the mould.

It is advantageous for the tire vulcanizing press according to the invention to be associated with a set of moulds comprising a plurality of groups of moulds, each group consisting of two moulds of which one is arranged to mould a tire the size of which is different from that to be moulded by the other mould, the two moulds of each group, in the closed condition thereof, being of the same height considered axially thereof. Advantageously the height of the moulds varies from group to group by the same amount. With adaptation of the moulds to the press in this way it is possible to manage with a relatively small number of adaptor plates.

DESCRIPTION OF THE PREFERRED EMBODIMENT

Figure 1:
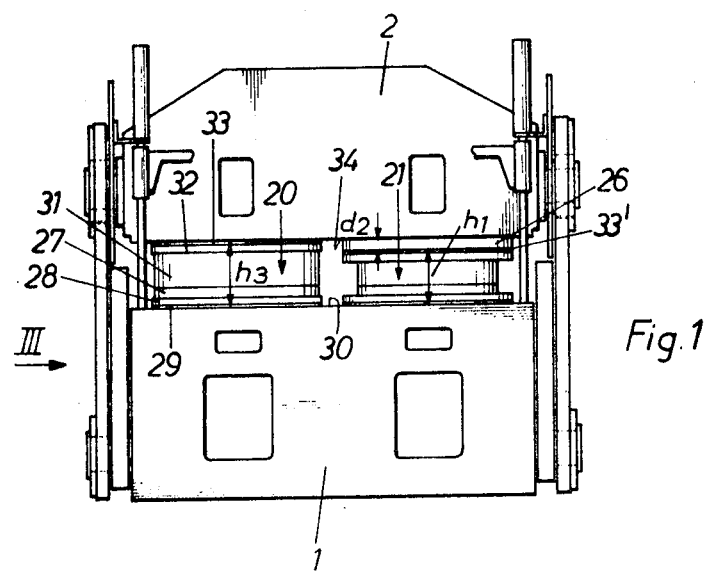
FIG. 1 is a front elevation of a double press according to the invention.

Referring to the drawings, the press has a bottom part 1 and a top part 2, FIG. 1. On the bottom part 1 (see FIG. 3) a drive device designated generally 3 is installed. The drive device 3 consists of an electric motor 4 to which a reduction gear train 5 is attached, a worm drive 6, a shaft 7 which extends over the entire width of the press and on the ends of which pinions 8 are mounted, and two large crank discs 9 provided with peripheral teeth and with crankpins 10, as well as two connecting rods 11 which are articulated on the pins 10.

The upper end of each of the connecting rods 11 is provided with an opening 12 in which a bearing 13 is arranged to slide lengthwise of the connecting rod. Each bearing 13 has a bore 14 to house a pin 15 on the top press part 2.

Figure 3:
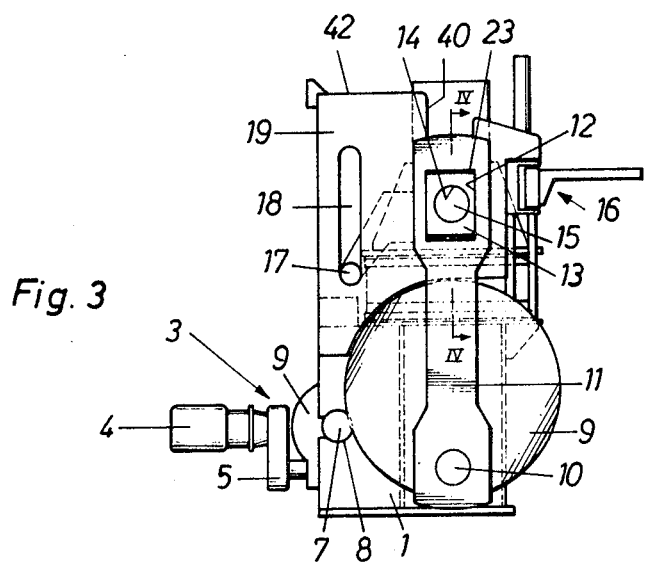
FIG. 3 is a view of the press looking in the direction of the arrow III in FIG. 1.

The press is also provided with two feed devices which are designated generally 16, FIG. 3, and with the aid of which tire blanks can be introduced into the press. A discharge device for discharging vulcanized tires from the mould is omitted from the drawings for the sake of clarity.

The top press part 2 is guided for vertical reciprocation by slots 18 and 40, FIG. 3, which are provided on side parts 19 disposed on the bottom press part 1. Guide rollers 41 mounted on the pins 15 cooperate with the slots 40 (see FIG. 4). For the additional guiding of the top press part 2 use is made of pins 17 which are engaged in the slots 18. After the top part 2 has been raised to such an extent that the rollers 41 can move away from the slots 40, the rollers 41 roll on the top horizontal edges 42 of the side parts 19.

Tire vulcanizing moulds 20 and 21, FIG. 1, are disposed between the bottom press part 1 and the top press part 2.

Figure 4:
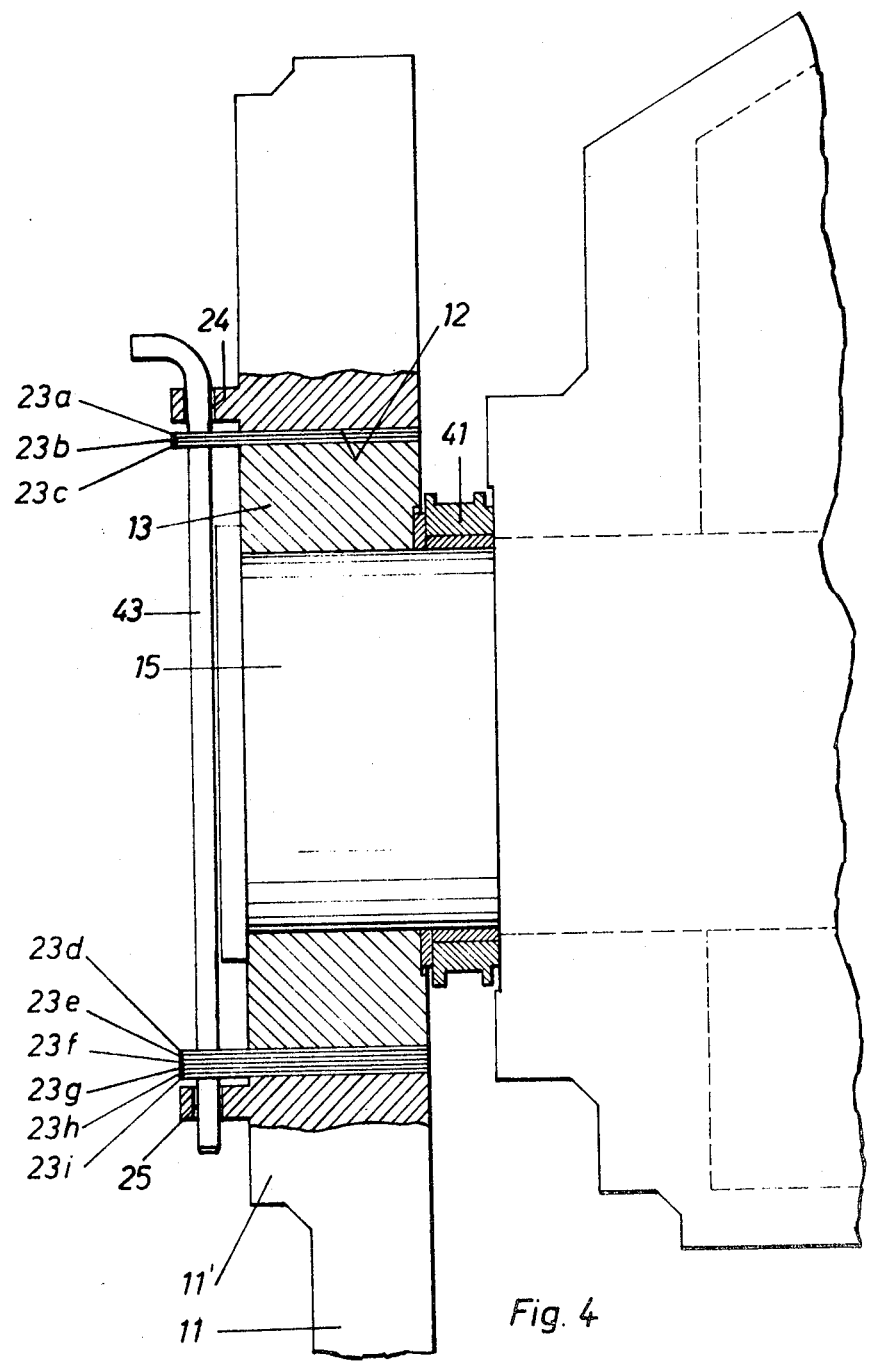
FIG. 4 is a partial section, to an enlarged scale, on the line IV—IV in FIG. 3.

The bearings 13 are disposed in the openings 12 to be vertically slidable, while for the purpose of adjusting their vertical positions in the openings 12 use is made of shim plates 23a to 23i (see FIG. 4). In addition adaptors 26, FIG. 1, are provided and are used for adapting the press to accommodate moulds of different heights in a manner which will be further described below.

In FIG. 4 three shim plates 23a, 23b, and 23c are shown above the bearing 13 and six shim plates 23d to 23i are shown below the bearing 13. The shim plates project laterally beyond the top portion 11' of the connecting rod 11 and in their projecting region are provided with bores which are aligned with bores 24 and 25, FIG. 4, provided in projecting portions of the connecting rod 11. A fastening pin 43 is passed through the bores 24, 25 and the bores in the shim plates 23 and is bent over at the top to prevent it from falling out and to facilitate its handling.

Each mould has a bottom part 27, FIG. 1, which rests on a heating plate 28 which in turn rests, with the insertion of a thermal insulating plate 29, on a table situated on the bottom press part 1. In addition, each mould has a top part 31, the upper side of which lies against an upper heating plate 32 which in turn is fastened, with the interposition of a thermal insulating plate 33, on a bottom fastening surface 34 of the top press part 2.

In FIG. 1, a vulcanizing mould 20 with a maximum height $h_3$ (including the thermal insulating plates) and another vulcanizing mould with a minimum height $h_1$ are illustrated. Vulcanizing moulds with the height $h_3$ are moulds which have the maximum height dimension which can be fitted in the press. By means of an adaptor 26 which as viewed in plan has dimensions not less than those of the mould 21 and which has a thickness $d_2$, the mould 21 is "artificially" brought to the same height as the mould 20. Consequently, $h_3 = h_1 + d_2$. The adaptor 26 is disposed above the top insulating plate 33', so that irrespective of the mould height the heat of the heating plate 28 is transmitted direct to the mould.

In order to permit exact adjustment of closing pressure, the previously mentioned shim plates 23 are provided. Like the top press part 2, the connecting rods 11 are elastic to a certain extent and become elongated on the closing of the press, or more accurately the clamping of the press. This elongation is of the order of magnitude extending from a few tenths of a millimeter to about one millimeter. Since the crank disc 9 and its mounting on the bottom press part 1 and also the crankpin 10 are deformed to a certain extent, within the limits of their elasticity, on the clamping of the press, adjustability of a few millimeters must be taken into account between the bearing 13 and the opening 12 in the connecting rod 11. The dimensional tolerances of the various parts of the press, which determine the distance between the bottom press part 1 and top press part 2, and also the dimensional tolerances in the thickness of the heating plates and insulating plates are also reasons to provide relatively great adjustability to despite the fact that in themselves the mould heights are fixed. After coarse adaptation has been effected by inserting an intermediate adaptor plate 26, the exact closing pressure is adjusted by suitable arrangement of the shim plates 23. The adjustment of the press will be described with the aid of the following numerical example.

It will be assumed that the press has a maximum closing pressure of 600 tons, that is to say 300 tons for each heating station. This closing pressure, which is required for the largest tire (12.00 - 20) to be heated in the press, is obtained when — as illustrated in FIG. 4 — three shims 23a, 23b, 23c, each of which has a thickness of 0.5 mm, are inserted above the bearing 13. The deformation or clamping, referred to the distance between the table of the bottom press part and the lower side of the top press part 2, amounts in this case to 6 mm. If the smallest tire size (8.25–20) for which the press is intended is being made in the press, a closing pressure of 200 tons per heating station will be sufficient for this purpose, this pressure being reached with clamping deformation of only 5 mm. In this case therefore two shim plates each of 0.5 mm are taken out from beneath the bearing 13 and inserted above the latter. If it is desired to employ a medium closing pressure, for example for the tire size 10.00 - 20, only one shim plate is changed over in this manner.

The utilization of the shims 23 is therefore not restricted solely to the adjustment of the maximum closing pressure previously made by the makers, but makes it possible for the user of the press to adapt the closing pressure to his own individual requirements, which in the long run is advantageous to the life of all drive parts of the press.

Figure 5:
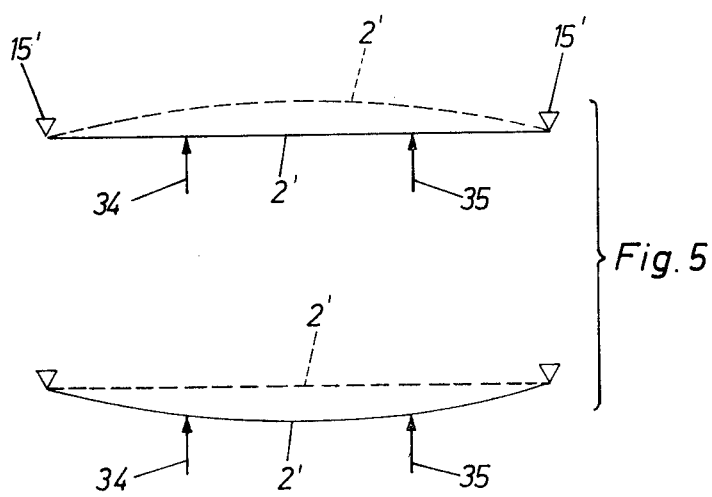
FIG. 5 is a diagram illustrating the deflection of the top press part.

The deflection of the top press part is illustrated diagrammatically in FIG. 5. The support points 15' correspond to the pins 15 on the top press part 2. The beam 2' corresponds to the top press part 2, and the arrows 35, 36 indicate in simplified manner the forces which the moulds 20, 21 in the closed press apply to the top mould part. If the support surface on the top mould part 2 is flat, it will deflect in the upward direction, as indicated with great exaggeration by the broken line 2'. If the deflection exceeds a certain minimum, this may have the result of producing unequal closing pressure over the periphery of the mould, the closing pressure being greater in the outer regions nearer the connecting rods 11 than in the inner region, which will give rise to impermissible expulsion of rubber on one side of the tire. This may be remedied by giving the top press part 2 (represented by the beam 2') a certain downward curvature as illustrated in the bottom sketch in FIG. 5, so that under the action of the forces 35, 36 the surface 34 becomes substantially flat when the press is closed.

Figure 2:
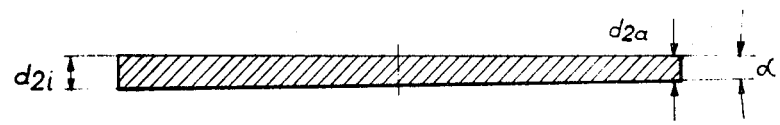
FIG. 2 is a diametral section through an insulating plate.

This is achieved in a simple manner by giving the insulating plates 33, 33' a slightly tapered shape, as illustrated in FIG. 2, instead of a plane parallel-sided shape. The plate is made wedge-shaped in such a manner that its thickness $d_{2i}$ on the inner side of the press is slightly greater than its thickness $d_{2a}$ on the outer side. The difference between the measurements $d_{2i}$ and $d_{2a}$ may, for example, be within the range from 0.2 to 1.0 mm. This has the consequence that the wedge angle $\alpha$ is extremely small. With the bare eye the wedge shape of the plates will not be perceptible at all. The use of such tapered plates makes it possible for the clamping surface 34 to be made flat and nevertheless to take into account the deflection of the top press part 2. It would also be possible for the heating plates to be made tapered instead of the insulating plates. The tapered construction of the insulating plates provides the advantage that machining costs are kept low, since the small wedge angle can best be produced by grinding and the insulating plates must in any case be ground.

Figure 6:
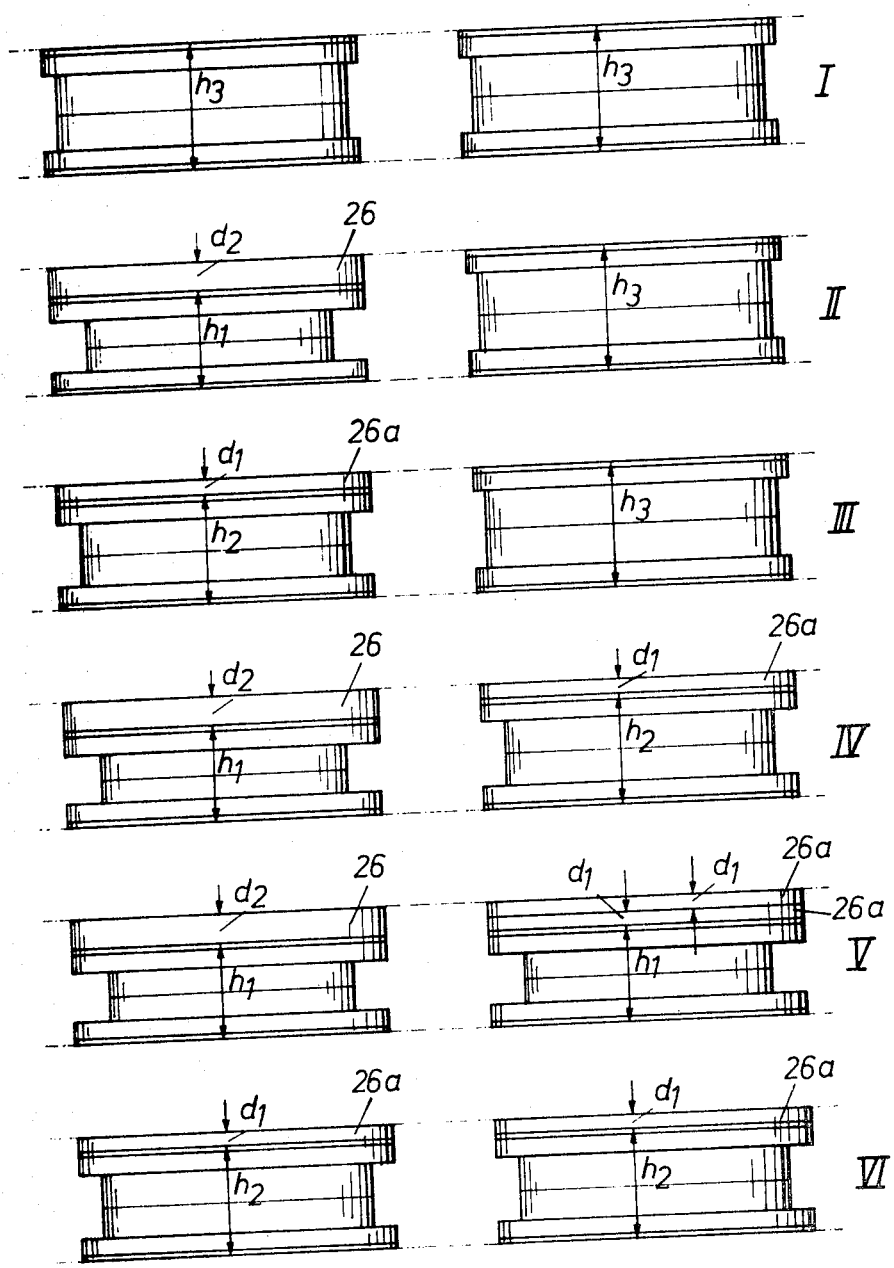
FIG. 6 shows various possible ways of installing moulds of different heights.

FIG. 6 shows various mould combinations. In the top row I are shown two moulds which together with the heating plates and insulating plates each have the height $h_3$. In this case no adaptor plates are necessary. In the arrangement shown in row II there are illustrated a mould with the minimum height $h_1$ and a mould with the maximum height $h_3$. In order to bring the mould with the height $h_1$ to the height $h_3$, an adaptor 26 of the thickness $d_2$ is provided. This combination corresponds to that illustrated in FIG. 1. Line III shows a mould of the height $h_3$ and a medium height mould of the height $h_2$. An adaptor plate 26a of the thickness $d_1$ is placed on the mould of the height $h_2$. Line IV shows a minimum height mould of the height $h_1$ and a medium height mould of the height $h_2$. A thick adaptor plate 26 of the thickness $d_2$ is placed on the mould of the height $h_1$ and a thinner adaptor plate 26a of the thickness $d_1$ is placed on the mould of the height $h_1$. Line V shows two minimum height moulds with the height $h_1$. On the left-hand mould there is placed a single thick adaptor plate 26 of the thickness $d_2$, while on the mould situated on the right there are placed two thinner adaptor plates 26a, each of the thickness $d_1$. Line VI shows two moulds of the medium height $h_2$. A thin adaptor plate 26a of the thickness $d_1$ is placed on each of these moulds.

FIG. 6 shows three groups of moulds, namely minimum height moulds of the height $h_1$, medium height moulds of the height $h_2$, and tall moulds of the height $h_3$. With only three adaptor plates, namely one adaptor plate of the thickness $d_2$ and two adaptor plates of the thickness $d_1$, all these moulds can be installed side by side in a double press.

In order to give a practical example, the following figures will be mentioned. The set may comprise two moulds of a height of 340 mm, in which case one of these moulds is intended for the tire size 8.25–20 and the other for the tire size 9.00–20. Another group of moulds consists of two moulds each of a height of 380 mm, one mould being intended for the tire size 10.00–20 and the other for the tire size 11.00–20. A third group consists of three moulds, each with a height of 420 mm, one mould being intended for the tire size 12.00-20, the second for the tire size 13–22.5, and the third for the size 12R20. The heights of the moulds of the various groups thus differ from one another by 40 mm in each case. An adaptor plate of a thickness of 80 mm and two adaptor plates each of a thickness of 40 mm are then provided for this set of moulds.

I claim:

1. A tire vulcanizing press comprising a bottom press part to receive in side by side relation the lower parts of each of two tire vulcanizing moulds, a top press part reciprocable towards and away from the bottom press part and arranged to receive the top parts of the two moulds, connecting rods located one each on opposite sides of the press, each said rod being pivotally connected to the top press part by a pin carried by the top press part and mounted in a bearing slidable lengthwise of the rod in an opening formed in the rod, shim plates located in the openings in the rods to determine the longitudinal positions of the bearings in the openings, driving means mounted on the bottom press part are operable to actuate the connecting rods to effect reciprocation of the top mould part, top and bottom heating plates for each mould arranged respectively for engagement with the top and bottom of a mould, heat insulating plates interposed respectively between the heating plates and the top and bottom press parts, and at least one adaptor insertable between a mould and one of said press parts to adapt the press to accommodate moulds of different heights.

2. A tire vulcanizing press according to claim 1, wherein each adaptor is a one-piece plate.

3. A tire vulcanizing press according to claim 2, wherein the adaptor plate as viewed in plan has dimensions not less than those of the mould.

4. A tire vulcanizing press according to claim 1, wherein on at least one side of each mould the insulating plate or the heating plate has in the region thereof nearest a connecting rod a lesser thickness than that of the portion of the plate which is diametrally opposite in relation to the axis of the mould.

5. A tire vulcanizing press according to claim 4, wherein the said plates are wedge-shaped.

6. A tire vulcanizing press according to claim 1, wherein the shim plates project laterally out of the openings in the connecting rods and the projecting portions are provided with holes, and wherein a fastening pin is passed through said holes and through holes provided in the connecting rod.

7. A set of tire vulcanizing moulds for use between a pair of relatively movable press parts, comprising at least two moulds mounted on one of said press parts, one arranged to mould a tire the size of which is different in width from that to be moulded by the other of said moulds, at least one of said two moulds having adaptor means mounted between one of said moulds and at least one of said press parts so that said two moulds, in the closed condition thereof, have the same height considered axially thereof.

8. A set of moulds according to claim 7, including a plurality of groups of moulds, each group comprising two moulds, and wherein the height of the moulds varies from group to group by the same amount.

9. A set of moulds according to claim 8, wherein said adaptor means includes first adaptor plates having a height which is equal to twice said amount, and second adaptor plates the height of which is equal to said amount.

10. A set of moulds according to claim 9, wherein in a set of three groups there is one first adaptor plate and two second adaptor plates.

* * * * *